No. 809,969. PATENTED JAN. 16, 1906.
McCLELLAND MYERS.
GLASS MOLDING APPARATUS.
APPLICATION FILED MAR. 22, 1905.

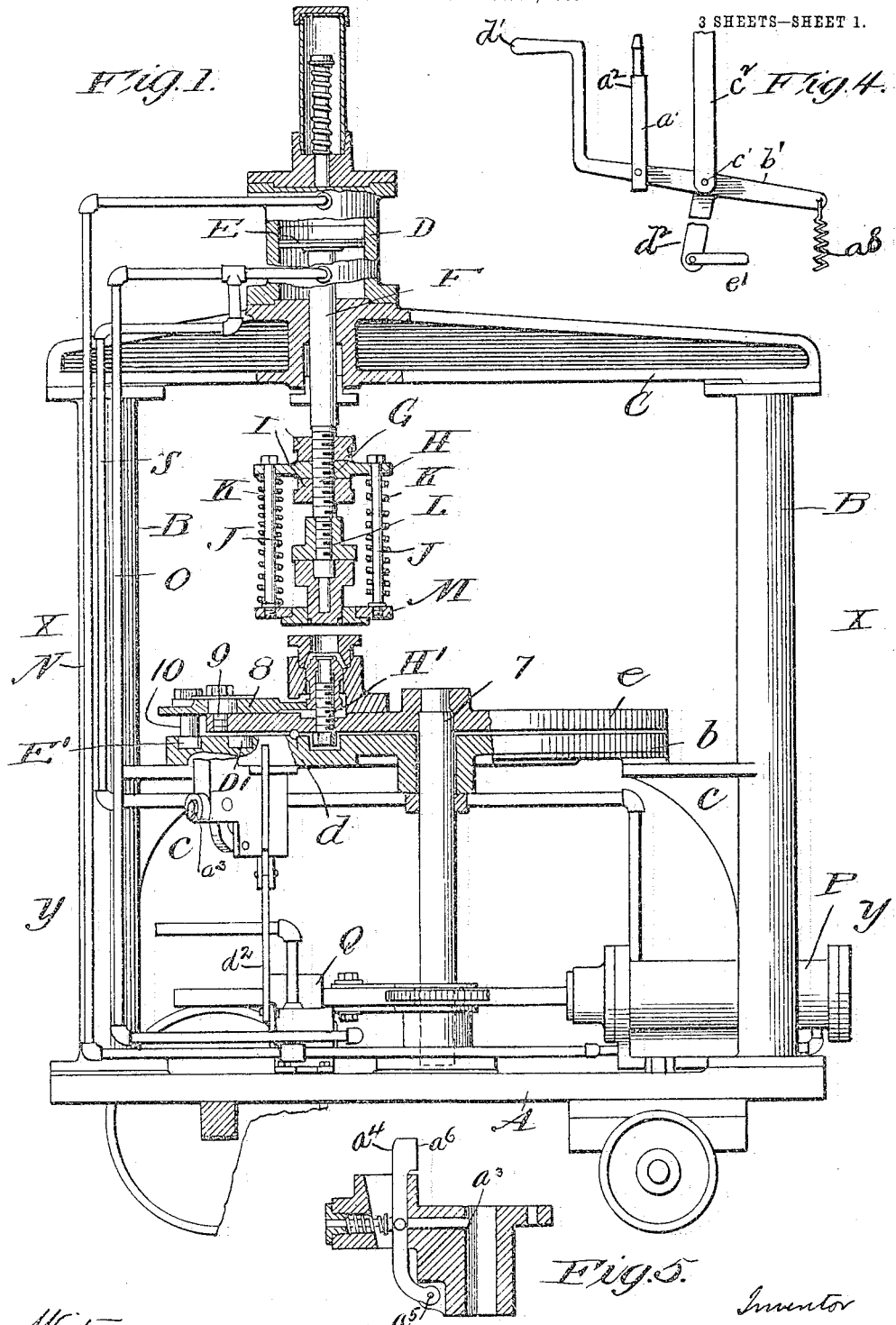

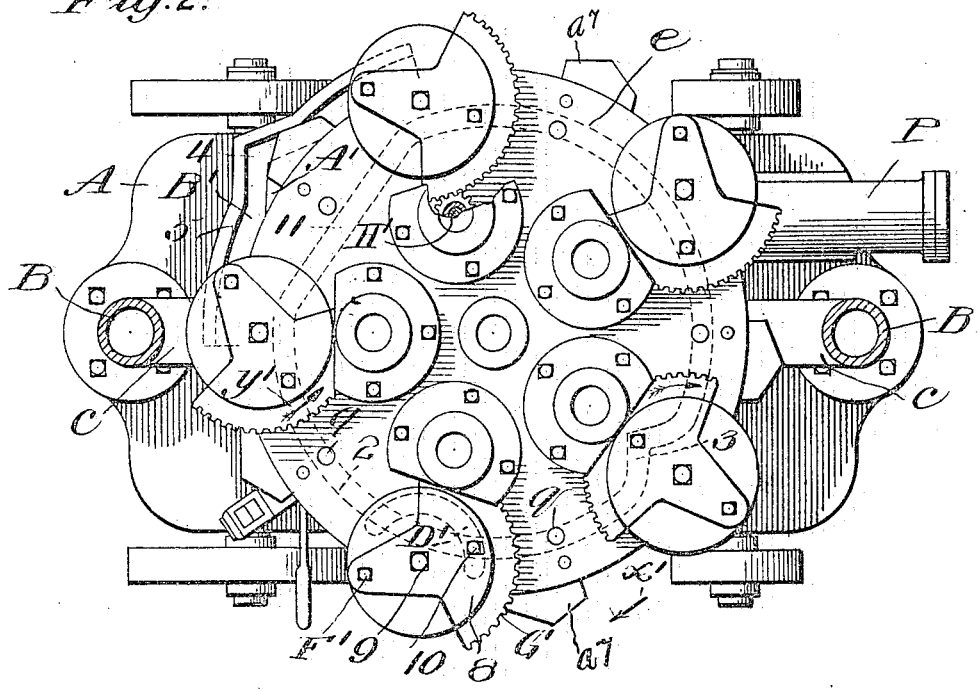
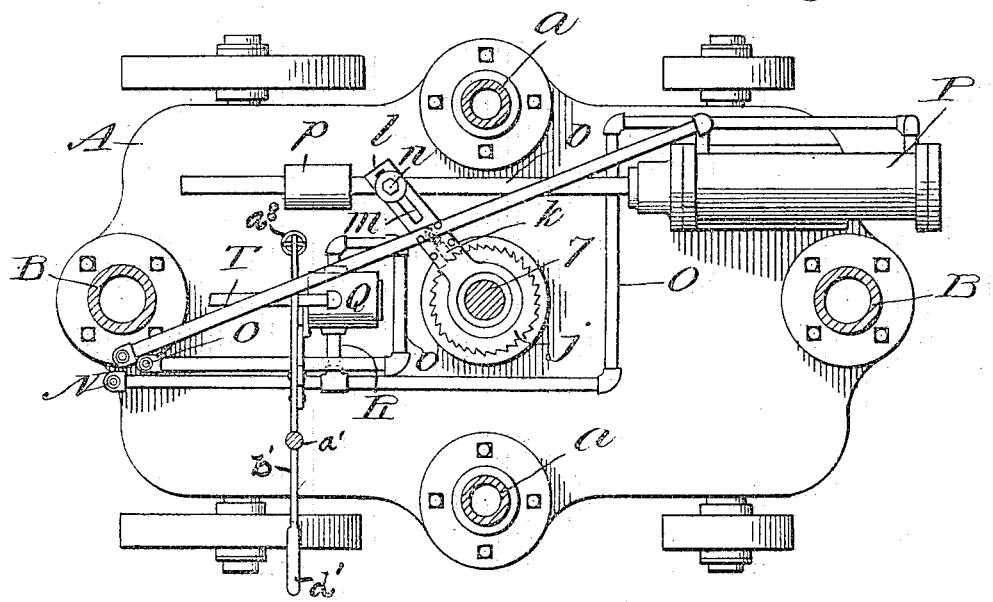

Witnesses
Inventor
McClelland Myers,
Attorney

UNITED STATES PATENT OFFICE.

McCLELLAND MYERS, OF MOOSIC, PENNSYLVANIA.

GLASS-MOLDING APPARATUS.

No. 809,969.　　　Specification of Letters Patent.　　　Patented Jan. 16, 1906.

Application filed March 22, 1905. Serial No. 251,480.

*To all whom it may concern:*

Be it known that I, McCLELLAND MYERS, a citizen of the United States of America, residing at Moosic, in the county of Lackawanna and State of Pennsylvania, have invented certain new and useful Improvements in Glass-Molding Apparatus, of which the following is a specification.

This invention relates to glass-molding machinery, and particularly to a machine designed for use in molding caps for jars, insulators, and other articles which are threaded either internally or externally, the device as here disclosed, however, being confined to a means for threading the article internally.

An object of this invention is to produce means whereby a series of molds are automatically brought into alinement with a presser-head and extracting-plunger successively, whereby the material is pressed into shape and finally extracted from the mold.

The invention further consists in the provision of novel means whereby the cap, insulator, or other article is pressed from the outside and whereby it is manufactured in its upright position or with the outer surface up.

Furthermore, an object of this invention is to provide novel means for rotating the threading device, whereby as the mold is carried around the table the threading device is automatically rotated for forming the thread within the article, means being provided also for intermittently carrying and arresting the molds.

A further object of this invention is to produce a machine in which the different steps of the operation are carried on by automatically-controlled mechanism and whereby the product with its internal thread is produced entirely by machinery.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts throughout the several views, in which—

Figure 6:
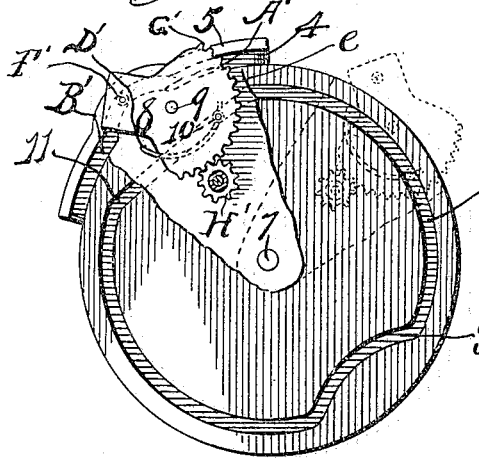
Figure 7:
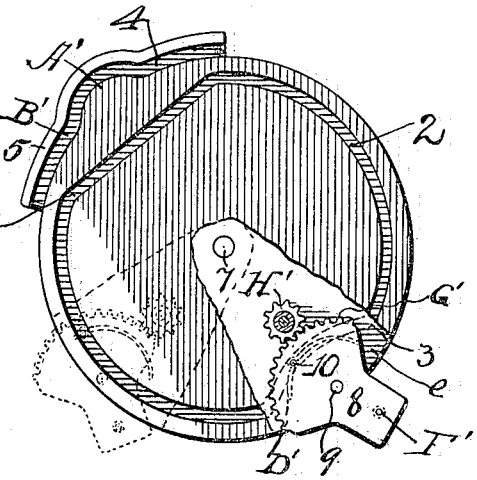
Figure 8:
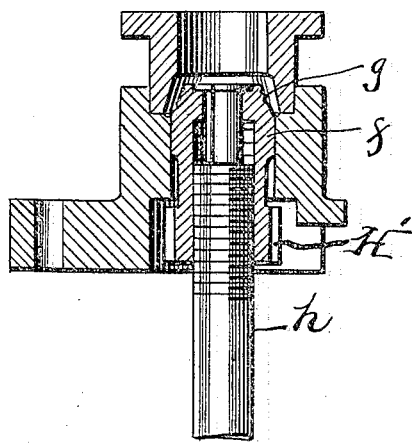
Figure 9:
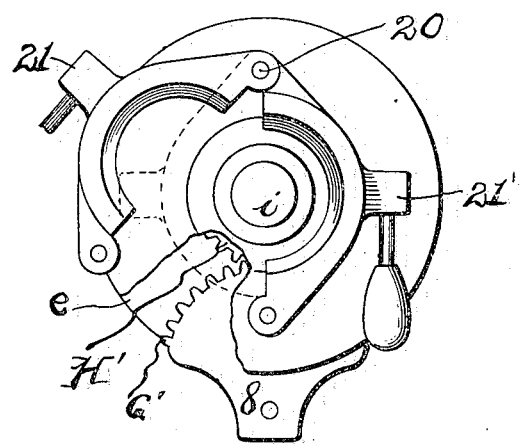

Figure 1 is a view in elevation, partly in section, illustrating a machine embodying the invention. Fig. 2 is a horizontal sectional view taken on a line corresponding with the line $x\ x$ of Fig. 1. Fig. 3 is a horizontal sectional view taken on a line corresponding with the line $y\ y$ of Fig. 1. Fig. 4 is a detail view showing the controlling-lever and its connections. Fig. 5 is a sectional view showing the automatically-operated detent. Fig. 6 is a plan view of the threader-actuating means. Fig. 7 is a plan view showing the parts in a different position from that shown in Fig. 6. Figs. 8 and 9 are detail views showing the construction of the molds.

In the drawings, A indicates a suitable truck provided with a standard or column B at each end, which column supports the beam C. Mounted on the beam C is a cylinder D. Within the cylinder D is a piston E, having a depending piston-rod F, which passes through an aperture in the beam and terminates in a threaded portion G. A plate H is secured on the end of the piston through the medium of the nuts I, whereby the position of the plate may be changed with relation to the end of the piston. Bolts J are slidable in the plate and are encircled by springs K. A presser-head L is attached to the end of the piston-rod and is adapted to move through the opening in a plate M, which is secured on the lower ends of the bolts J—that is, as the piston is projected and the plate M is arrested, as hereinafter described, the presser-head will move with relation to the plate M and pass through the opening in the plate and press the material in the mold.

The piston is moved preferably by compressed air, which is delivered to opposite sides of said piston through the medium of pipes N and O. The pipe N leads to and communicates with the rear end of a cylinder P and the pipe O leads to and communicates with a valve Q, with which the pipe N is also connected through the medium of the short pipe R. A pipe S is tapped and the pipe O extends to the end of the cylinder P opposite to end to which the pipe N is tapped, while another pipe T is tapped into the valve Q and leads to any suitable source of supply. It is preferable to have the pipe connections so arranged as to insure a depression of the piston in the cylinder D and at the same time the piston in the cylinder P to project the piston-rod, while the pipes S and O are so connected as to be open to move the cylinder in the piston up and at the same time to move the piston in the cylinder P to retract the piston-rod thereof for purposes to be presently explained.

Mounted on the truck A are two posts $a\ a$, one on each side of the said truck. A table $b$ is supported by and attached to said posts and to the brackets c, extending from the column B. This table is provided with a ballway d for the purpose of receiving antifriction-balls, on which the rotatable table e is mounted in order to reduce friction. The stationary table is provided with a camming-groove 2, which is curved inwardly, as at 3, and has a straight portion 11 diametrically opposite that portion which is inwardly curved. The stationary table has a peripheral lug A' with a curved edge, which forms a cam. The stationary table has an extension B', provided with a groove 4, the outer edge of which is bounded by a flange 5, having its inner surface or edge parallel with the edge of the table and the lug A' thereof.

A shaft 7 is journaled centrally of the table and extends therethrough and is keyed or otherwise secured to the rotatable table e, and the said shaft is rotated through a mechanism to be presently explained. Suffice it to say that the said table is rotated and the plates 8 are pivoted thereto by the studs or pins 9 in a manner to allow the free oscillation of the said plates with relation to the rotatable table. Studs 10 are secured to the under surface of the plates 8 and depend through the slots D' of the rotatable table and into the groove 2 of the stationary table. The studs 10 are provided with antifriction-rollers E', which rotate in the groove of the stationary table as they are carried therein with the rotation of the rotatable table. It will be observed that as the studs 10 move in the groove 2 the camming action of the curved portion of the slot acts to turn the plates on their axes, thereby partially rotating the said plates with each rotation of the table. At a point diametrically opposite said studs 10 are depending studs F', which are designed to ride in the slots 4 to engage the flange 5 and the cam edge of the lug A' heretofore described. The segmental portions of the plates 8 are provided with teeth G', and the said teeth mesh with the pinions H', rotatable on the table.

It will be observed in operation when the table is moved in the direction of the arrow x' in Fig. 2 the plates 8 on the table will be moved in the direction of the arrow y' indicated on said plates. When the parts are brought to the position shown in Fig. 2, the direction of rotation of the plates is reversed, owing to the studs 10 having moved in a circular direction through the curved portion 3 of the groove 2.

In the enlarged detail views shown in Figs. 6 and 7 a fragment of a rotatable table is shown with one end of the plates 8 illustrated. The pinions H' each have splined thereto a sleeve member f, having its upper end reduced and provided with a male thread g, and the said sleeve member is internally threaded on a bolt h, so that with the rotation of the sleeve it is reciprocated. The upper end of the bolt is reduced, and the reduced portion projects through the sleeve member and terminates in a head i, which is normally seated in a recess in the upper end of the sleeve and has its upper surface flush with the upper surface of the sleeve. The mold is formed in two sections pivoted together at the point 20, and each member has a lug 21, to which a handle is attached for the purpose of manipulation.

In the operation of the device the mold is placed under the plunger, and glass from which the article is to be formed is dropped into the top of the mold and the plunger is brought down in the ordinary manner. The rotation of the sleeve on the bolt results in the said sleeve traveling down the bolt and the threaded section of the sleeve is withdrawn from the article being formed. The said article is held in position by the head of the bolt while the said sleeve is being withdrawn, and after the threads of the sleeve are disengaged from the threads of the article the said article is supported on the head of the bolt and is removed in the ordinary manner. With the reversal of the direction of rotation of the pinion as heretofore described in connection with the operation of the plate 8 the sleeve is moved upward until the head rests in the recess in the end of the sleeve or to the normal position, which is shown in Figs. 1 and 8.

The foregoing description with relation to the mold described one of a series of molds, as illustrated in Fig. 1, and it will be apparent that the molds are successively brought into alinement with the plunger or presser and also that they are successively discharged after the molds move away from the presser.

The means for rotating the table comprise a ratchet-wheel j, which is mounted on the shaft 7, and coacting with the said ratchet-wheel is a dog k. An arm l carries the dog k and has a slot m in its end to receive the point n, which is on the piston-rod o. The piston-rod operates through the guide p, which is suitably supported on the table. As the actuating agent, either air or steam, is admitted to alternate ends of the piston P, its piston-rod is reciprocated, and hence the arm l is oscillated. This oscillation of the arm intermittently rotates the ratchet-wheel, and hence motion is communicated to the table.

For the purpose of retaining the mold in perfect alinement with the presser I provide a series of apertures q in the movable table, which are adapted to aline with a hole in the stationary table, and the bolt a' is adapted to enter the holes of the movable table successively for the purpose of retaining the said movable table stationary while the plunger is operated to press the glass. It is my purpose to operate the bolt and with the operation of the bolt to control the valve Q for supplying air to the two cylinders D and P simultaneously—that is, when the bolt is seated with one of the molds under the presser air is admitted to the top of the cylinder D and to the outer end of the cylinder P. This pressure results in driving the presser in contact with the material in the mold, and at the same time projects the piston of the cylinder P so that the dog carried by the arm $l$ engages teeth in advance of the teeth it engaged before it was projected. As the material has been pressed sufficiently, the bolt is withdrawn from the hole in the movable table, so as to release the said table, and at the same time the valve Q is moved to admit air to the bottom of the cylinder P, thus elevating the presser and retracting the piston of the cylinder P, which results in turning the table through the agency of the arm, dog, and ratchet.

The mechanism for retaining the stationary table during the operation of the plunger comprises, as stated, a bolt $a'$, which is adapted to pass through the coinciding apertures of the stationary table and movable table, and when said bolt is depressed means are provided for retaining it depressed until the table has traveled a predetermined distance, when the latch is tripped and the bolt released. The bolt $a'$ is carried on a lever $b'$, which lever is pivoted on the pin $c'$ and supported by the hanger $c^2$. The lever terminates in a handle $d'$, which is depressed by the operator when the bolt is drawn from the aperture of the movable table. The bolt is sufficiently depressed to cause the recess $a^2$ to aline with the latch-bolt $a^3$, which is spring-pressed to hold it normally projected. The latch-bolt has a lever $a^4$, which is pivoted at the point $a^5$, and said lever has a plain surface $a^6$, which is engaged by the lugs $a^7$, contacting with the lever $a^4$. The latch-bolt $a^3$ is retracted and the bolt $a'$ is released, and when it is released the action of the spring $a^8$, which is connected to the end lever, tends to carry the bolt upward to seat it in the manner heretofore described. The lever $b'$ has an arm $d^2$, which moves with it, and said arm has on its lower end a link $e'$, which is connected to the stem of the valve Q, so that the said valve is rotated for the purpose of establishing communication with the pipes to carry the actuating agents to and from the cylinders D and P, as heretofore fully explained.

Having fully described my invention, what I claim as new, and desire to secure by Letters Patent, is—

1. In a glass-molding apparatus, a stationary table, a shaft journaled centrally of the table and extending therethrough, a second table held by the shaft and arranged over the stationary table, a ratchet fixed on the shaft beneath the stationary table, an arm arranged on the shaft, a dog carried by the arm to engage the ratchet, means for oscillating the arm, and molds carried by the movable table.

2. In a glass-molding apparatus, a stationary table, a shaft journaled centrally thereof and extending therethrough, a second table held by the shaft and arranged above the stationary table, a ratchet fixed on the shaft, a slotted arm arranged on the shaft, a dog carried by the arm to engage the ratchet, a rod, means passing through the slot of the arm to pivotally secure the rod to the arm, and means for reciprocating the rod.

3. In a glass-molding apparatus, a stationary table, a shaft journaled centrally thereof and extending therethrough, a second table held by the shaft and arranged above the stationary table, a ratchet fixed on the shaft, a slotted arm arranged on the shaft, a dog carried by the arm to engage the ratchet, a rod, means passing through the slot of the arm to pivotally secure the rod to the arm, a guide for the rod and fluid means for reciprocating the rod.

4. In a glass-pressing machine, a stationary table, a movable table thereon, means for rotating the movable table, molds on the movable table, means whereby the movement of the table actuates portions of the molds, means for alternately rotating and arresting the movable table, means for holding it in its arrested position, a suitably-operated presser and means whereby the table-arresting means controls the presser-operating mechanism and the table-operating mechanism.

5. In a glass-pressing machine, a stationary table, a table movable with relation to the stationary table, molds carried by the movable table, means whereby the movement of the table actuates certain portions of the mold, means for holding the tables in certain relation, a presser acting in conjunction with the top of the molds, means under the control of the table-holding device for projecting the presser and means for retracting the presser when the table is released.

6. In a glass-pressing machine, a stationary table, a movable table, molds carried by the movable table, means whereby the movement of the table actuates certain portions of the molds, means for holding the tables in certain relation, a presser acting in conjunction with the top of the molds, means under the control of the table-holding device for projecting the presser, means for retracting the presser when the table is released, and means for actuating the table at the time the presser is being retracted.

7. In a glass-molding apparatus, a stationary table, a movable table arranged thereover, molds carried by the movable table, means carried by the molds for both threading and ejecting, means for rotating the movable table, and means carried by the movable table acting in conjunction with the stationary table for operating the threading and ejecting means when the movable table is rotated.

8. In a glass-molding apparatus, a suitable frame, a stationary table thereon, a table movable with relation to the stationary table, molds carried by the movable table adapted to mold the article in its upright position, means for pressing the material from the exterior and top, means for actuating the presser, means for rotating the table, means for retracting the presser, means intermittently holding the stationary table in fixed relation to the movable table, means for releasing the movable table and means for simultaneously controlling the presser-operating mechanism and table-actuating mechanism.

9. In a glass-molding machine, a suitable frame, a stationary table supported thereon, camming-grooves in the table, a rotatable table acting in conjunction with the stationary table, means for intermittently rotating the table, means for intermittently retaining the rotatable table stationary, molds carried by the movable table, a presser acting in conjunction with the molds successively, means carried by the movable table and coacting with the camming-grooves of the stationary table for operating portions of the molds as and for the purposes described.

10. In a glass-molding apparatus, a stationary table, a shaft extending through the stationary table, a movable table on the shaft coacting with the stationary table, molds carried by the movable table, means on the molds for threading the article internally, means carried by the movable table whereby the threading apparatus is actuated, means whereby the rotation of the movable table with relation to the stationary table causes the actuation of the threading means, and means for intermittently rotating the table, substantially as described.

11. In a glass-molding machine, a suitable frame, a table supported thereon, camming-grooves in the table, a rotatable table acting in conjunction with the stationary table, a shaft on which the rotatable table is mounted, a ratchet-wheel on the shaft, a ratchet engaging the wheel, means for operating the ratchet to intermittently rotate the table, means for intermittently retaining the tables stationary, molds carried by the movable table, a presser acting in conjunction with the molds successively, means carried by the movable table and coacting with the camming-grooves of the stationary table for operating portions of the molds as and for the purposes described.

12. In a glass-molding machine, a stationary table, a movable table arranged thereover, molds carried by the movable table, threading-sleeves carried by the movable table and extending within the molds, means for rotating the movable table and means carried by the movable table acting in conjunction with the stationary table for operating the threading-sleeve and extract the same when the movable table is rotated.

13. In a glass-molding machine, a stationary table, a movable table arranged thereover, molds carried by the movable table, bolts carried by the table extending within the molds, a threading-sleeve rotatable on each of the bolts, means for rotating the movable table, means whereby the rotation of the movable table rotates the threading-sleeve, and ejecting means carried by the bolts.

14. In a glass-molding machine, a stationary table, a movable table arranged thereover, molds carried by the movable table, bolts carried by the table extending within the molds, a threading-sleeve rotatable on each of the bolts, means for rotating the movable table, means whereby the rotation of the movable table rotates the threading-sleeve, and ejecting means carried by the bolts, passing through the sleeves.

15. In a glass-molding machine, a stationary table, a movable table arranged thereover, molds carried by the movable table, bolts carried by the table extending within the molds, a threading-sleeve rotatable on each of the bolts, means for rotating the movable table, means whereby the rotation of the movable table rotates the threading-sleeve, the upper portions of the bolts being reduced and passing through the sleeves.

16. In a glass-molding apparatus, a table, molds carried by the table, bolts carried by the table extending within the molds, a sleeve on each of the bolts, and means for reciprocating the sleeve on the bolt.

17. In a glass-molding apparatus, a table, molds carried by the table, bolts carried by the table extending within the molds, a sleeve on each of the bolts, and means for simultaneously reciprocating and rotating the sleeve on the bolt.

18. In a glass-molding apparatus, a table, molds carried by the table, bolts carried by the table extending within the molds, a sleeve threaded on each of the bolts, and means for rotating the sleeve on the bolt.

19. In a glass-molding apparatus, a table, molds on the table, bolts on the table extending within the molds, a sleeve threaded on the bolt, a pinion on the sleeve and means meshing with the pinion to rotate the sleeve on the bolt.

20. In a glass-molding machine, a movable table, molds on the movable table, a presser-head to coact with the molds successively, means for operating the head, means for intermittently moving the table, means for arresting the movement of the table, and suitable connections whereby the arresting means controls the operating means of the presser-head, and table-moving means.

21. In a glass-molding machine, a movable table, means for moving the table, a rod engaging the table to hold the table against movement, said rod having a notch, a spring-pressed rod engaging the notch when the rod is released from the table.

22. In a glass-molding machine, a movable table, means for moving the table, a rod engaging the table to hold the table against movement, said rod having a notch, a spring-pressed rod engaging the notch when the rod is released from the table, and means for disengaging the spring-lever from the notch.

23. In a glass-molding machine, a movable table, means for moving the table, a rod engaging the table to hold the table against movement, said rod having a notch, a spring-pressed rod engaging the notch when the rod is released from the table, and means whereby the movable table disengages the spring-lever from the notch.

24. In a glass-molding machine, a movable table, lugs on the table, means for moving the table, a rod normally engaging the table to arrest the movement thereof, means for releasing the rod from the table, a spring-pressed rod to engage the rod when released from the table, and a pivoted rod connected to the spring-rod, said pivoted rod being so arranged as to be engaged by the lugs of the movable table to release the spring-rod from the rod of the table.

In testimony whereof I affix my signature, in the presence of two witnesses, this 19th day of December, 1904.

McCLELLAND MYERS.

Witnesses:
B. F. ROBERT,
JOHN W. McDOWELL.